US012073477B1

(12) United States Patent
Buehrle et al.

(10) Patent No.: US 12,073,477 B1
(45) Date of Patent: Aug. 27, 2024

(54) LOW FRICTION DATA ANALYSIS SYSTEM

(71) Applicant: United Services Automobile Association (USAA), San Antonio, TX (US)

(72) Inventors: Amber K. Buehrle, Phoenix, AZ (US); Ramsey Devereaux, San Antonio, TX (US); Michael Hertz, San Antonio, TX (US); Michael Kyne, Saint Petersburg, FL (US); Theresa Marie Matowitz, San Antonio, TX (US); Steven Robert Seigler, Tampa, FL (US)

(73) Assignee: United Services Automobile Association (USAA), San Antonio, TX (US)

( * ) Notice: Subject to any disclaimer, the term of this patent is extended or adjusted under 35 U.S.C. 154(b) by 43 days.

(21) Appl. No.: 17/332,817

(22) Filed: May 27, 2021

Related U.S. Application Data

(60) Provisional application No. 63/031,839, filed on May 29, 2020.

(51) Int. Cl.
  *G06Q 50/163* (2024.01)
  *G06N 20/00* (2019.01)
  *G06Q 40/08* (2012.01)
  *H04L 12/28* (2006.01)

(52) U.S. Cl.
  CPC .......... *G06Q 50/163* (2013.01); *G06N 20/00* (2019.01); *G06Q 40/08* (2013.01); *H04L 12/2803* (2013.01)

(58) Field of Classification Search
  None
  See application file for complete search history.

(56) References Cited

U.S. PATENT DOCUMENTS

| 8,020,763 | B1* | 9/2011 | Kowalchyk | G06Q 30/06 705/40 |
| 10,387,966 | B1* | 8/2019 | Shah | G06Q 40/08 |
| 10,943,306 | B1* | 3/2021 | Gaudin | G06Q 30/0645 |
| 11,003,334 | B1* | 5/2021 | Conway | G06Q 40/08 |
| 2008/0065427 | A1* | 3/2008 | Helitzer | G16Z 99/00 705/4 |
| 2015/0154715 | A1* | 6/2015 | Wedig | G06Q 40/08 705/4 |
| 2017/0017214 | A1* | 1/2017 | O'Keeffe | G05B 15/02 |
| 2018/0246480 | A1* | 8/2018 | Bunker | F24F 11/62 |

* cited by examiner

*Primary Examiner* — Matthew S Gart
*Assistant Examiner* — Divesh Patel
(74) *Attorney, Agent, or Firm* — Fletcher Yoder, P.C.

(57) ABSTRACT

The present disclosure relates to analyzing data related to smart home activity that is useful to risk analysis, service cost determination/adjustment, and behavioral incentivization. A monitoring system may acquire maintenance information, contextual information, and/or financial information with minimal user input to assess risk associated with user behavior and home activity associated with a smart home. Based on generating a risk factor associated with the smart home, the monitoring system may provide a user with an accurate service cost (e.g., home insurance quote) related to the smart home activity.

17 Claims, 4 Drawing Sheets

LOW FRICTION DATA ANALYSIS SYSTEM

CROSS REFERENCE RELATED TO APPLICATIONS

This application claims priority from and the benefit of U.S. Provisional Application Ser. No. 63/031,839, entitled "LOW FRICTION DATA ANALYSIS SYSTEM," filed May 29, 2020. This U.S. Provisional Application is hereby incorporated by reference in its entirety for all purposes.

BACKGROUND

The present disclosure relates generally to monitoring smart home activity with minimal user input. More particularly, the present disclosure relates to systems and methods for acquiring data related to smart home activity that is useful to risk analysis, insurance related value determination/adjustment, and behavioral incentivization.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

Insurance related values (e.g., home insurance quotes) or service cost for a user may be determined by performing risk analysis on data related to home activity (e.g., home maintenance, commercial activity). Such insurance related values may be determined by collecting historical data from maintenance records, contextual information (e.g., weather, climate, commercial activity) related to a property, user input (e.g., questionnaires, interviews), and the like. For example, an insurer may increase a user's home insurance quote if the user has been known to neglect preventative checkups of a property, thereby increasing a risk of property damage due to a maintenance issue for which the insurer will ultimately be at least partly financially responsible. However, such user behavior may not always be documented. Further, obtaining data associated with home activity based on user input may be time consuming, inefficient, and burdensome. It is now recognized that systems and methods for analyzing smart home activity with minimal user input are user-friendly, reduce user time spent on inputting data, and enable accurate data analysis.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to monitoring and analyzing smart home data with minimal user input. In one embodiment, the current techniques include monitoring smart home activity via one or more sensors and/or processors. This monitoring may be used to determine or adjust an insurance related value (e.g., home insurance quote) based on generating a risk factor related to the smart home activity. An indication of an adjustment to an insurance related value may be presented to the user.

In one embodiment, a monitoring device may include a memory and processors. The processors may receive, via one or more sensors, maintenance information and contextual information related to a property. The processors may also receive, via one or more user devices, financial information of a user associated with the property. The processors may generate, via a machine learning engine, a risk factor relating to the property based at least in part on identifying one or more patterns from the maintenance information, the contextual information, and the financial information.

In another embodiment, a method includes receiving, via one or more sensors, maintenance information and contextual information related to a property. The method also includes receiving, via one or more user devices, financial information of a user associated with the property. Further, the method includes generating, via one or more processors by executing a machine learning engine, a risk factor of the property based at least in part on the maintenance information, the contextual information, and the financial information; and providing, via the one or more processors, an instruction to an output device to display an indication of the risk factor.

In yet another embodiment, a non-transitory, machine-readable medium may include computer-executable instructions executed by processors. The computer-executable instructions cause the processors to receive, via one or more sensors, maintenance information and contextual information related to a property. The processors may also receive, via one or more user devices, financial information of a user associated with the property. The processors may generate a risk factor relating to the property based at least in part on the maintenance information, the contextual information, and the financial information based on executing a machine learning engine.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
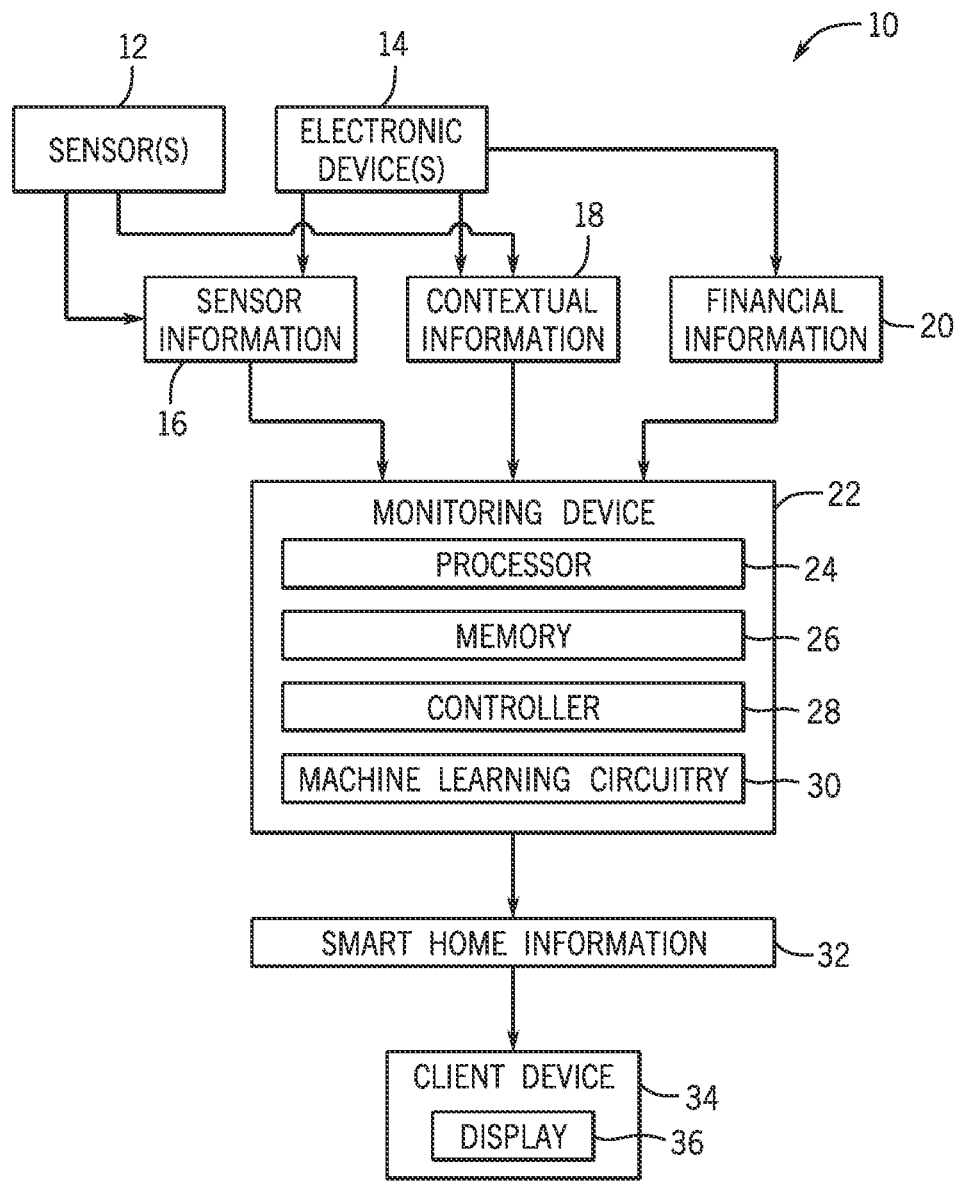
FIG. 1 illustrates a block diagram of a smart home monitoring system, in accordance with an embodiment of the present disclosure.

One or more specific embodiments of the present disclosure are described above. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. It should be noted that the term "multimedia" and "media" may be used interchangeably herein.

As discussed in greater detail below, the present embodiments described herein improve analysis of home activity (e.g., related to a residential property, a commercial property) that is useful to risk analysis, insurance related value determination/adjustment, and behavioral incentivization. As used herein, a smart home may include a homeowner property, a rental property, a commercial property, and so forth that is communicatively coupled to sensors and other electronic devices that monitor home activity (e.g., smart home data). Devices such as sensors and other appliances connected to Internet of Things (IOT) within the smart home be remotely monitored, controlled, and/or accessed and provide services or notification related to home activity to the user. As mentioned above, by analyzing smart home data with minimal user input and/or interaction reduces user time spent on inputting data related to home activity and increases accuracy of risk analysis of smart home data.

References to adjusting and/or determining the user's home insurance quote or service cost are examples of incentivizing the user to maintain safe home activity. Other incentivizing techniques (e.g., not related to insurance quotes) are also contemplated and meant to be included in each embodiment, including reducing the user's insurance deductibles, periodic reward payments, competitive and/or game scenarios (e.g., by enabling the user to compete with other user and/or accomplish milestones related to home safety and maintenance), and the like. Sensor information related to home activity and maintenance may be acquired from sensors integral with systems of the smart home, coupled with the smart home, and/or disposed in or around the smart home (e.g., temperature sensors within the smart home). Contextual information related to a context (e.g., weather, climate, foot traffic, commercial activity, user behavior) around the smart home may also be acquired from sensors associated with (e.g., integral with or disposed in) the vehicle or from external data sources (e.g., smart phone or other electronic devices). In some embodiments, financial information related to user accounts may be accessible to a monitoring system. In other embodiments, rather than having direct access to financial information of a user, the monitoring system may be provided with financial assessments of the user (e.g., buying behavior, whether the user is capable of paying a low, medium, or high deductible) from a financial institution.

Sensor, contextual, and financial information relating to home activity and behaviors of a user may be useful in accurately analyzing risk associated with the smart home by the monitoring service. In some embodiments, the monitoring service may be an insurance provider and may provide the user with an indication of a determination and/or adjustment to a home insurance quote based on analyzing risk associated with the smart home. Sensor information may be used to determined when or where the user or other residents of the smart home are via motion sensors, thermal sensors, and so forth to better assess user behavior and monitor home activity. In some embodiments, sensors such as moisture detection or carbon monoxide sensors may help provide information related to the maintenance of a smart home. For example, the monitoring system or an analysis algorithm may determine whether the smart home is at risk due to freezing pipes or even a broken waterline based on analysis of data from the moisture detection sensors. These sensors may alert a user about potential leaks in the smart home so that the user may fix the maintenance issue before the damage from the leak occurs.

Contextual information (e.g., weather, climate, foot traffic, commercial activity, user behavior) may also provide information related to home activity. Weather-related conditions, such as high winds, hail, snow, and so forth, may be considered as an example of the contextual information, which can be captured by certain onboard sensors (e.g., mechanisms for measuring wind speed or detecting precipitation) or by accessing weather data (e.g., via the Internet) based on an identified location of the smart home. Aspects of the geographical location of the smart home may also be considered as an example of the contextual information. For example, the contextual information may include a degree of safety, traffic congestion, or accident rates of the geographical location in which the smart home is located. The geographical location may be determined by computer location techniques, such as geo-fencing. In particular, the contextual information may include that the geographical location is considered a high crime, traffic, or accident rate area. The contextual information may be provided or accessed based on the date, time, and/or location that the sensor information was acquired. In some embodiments, crowdsourcing or social media may provide the contextual information via various applications and social media platforms operating on electronic devices (e.g., smartphones and the like).

Contextual information may include information related to foot traffic near or within the smart home as well as commercial activity. For example, by monitoring the frequency of movement and the number of people within or near the smart home via data related to foot traffic, the monitoring service or the analysis algorithm may determine the occupancy of the smart home (e.g., whether the smart home serves as a long-term or a short-term residence). Similarly, commercial activity (e.g., business hours of a property) may also provide insight on the occupancy of the smart home. The process for determining whether the smart home serves as a long-term or a short-term residence will be provided in more detail below.

Contextual information may also include user behavior. Non-limiting examples of user behavior may include willingness to be proactive, willingness to take on risk, buying behavior, and so forth. For example, if a user is proactive and performs regular maintenance check-ups, the risk associated with the smart home may be determined to be lower compared to a user who neglects performing maintenance check-ups. In some embodiments, such contextual information may be acquired by performing machine learning on data related to user activity and home activity.

The sensor information, contextual information, and/or financial information may be analyzed such that a risk factor or other score may be generated. For example, knowledge of frequent tornadoes or severe weather conditions associated with the geographic location of the smart home may serve to increase a risk factor of the smart home. The monitoring service or the analysis algorithm may accordingly increase the home insurance quote due to the increased risk factor. Assessing data related to home activity (e.g., sensor information, contextual information, and financial information) may prevent an improper increase in a user's risk factor (which may be all or a component of an overall score for calculating insurance related values). In some embodiments, a user may be recommended a maintenance procedure (e.g., fixing a broken pipe), that if completed within a period, would reduce a risk factor associated with the smart home. Information related to home activity and/or adjustment to an insurance related value may be provided to the user as an alert, notification, and so forth via a graphical user interface (GUI) of a client device. In this manner, the disclosed systems and methods may analyze home activity and subsequently provide accurate warnings, notifications, and other information related to a risk associated with the smart home to a user.

FIG. 1 depicts an example smart home monitoring system 10, according to implementations of the present disclosure. A user may own, rent, or otherwise be associated with a smart home. As shown in the example of FIG. 1, a monitoring service may acquire information (e.g., sensor information 16, contextual information 18, and financial information 20) related to home activity associated with the smart home.

The monitoring service may include any suitable type of computing device 22 but is not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe the monitoring computing device 22 as a physical device, implementations are not so limited. In some examples, the monitoring computing device 22 may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

In general, the monitoring computing device 22 captures a variety of sensor information 16 (e.g., motion data, thermal data, etc.) associated with the smart home via one or more sensors 12 or electronic devices 14 (e.g., smart phones). The sensors 12 may include any number or type of sensors, including location sensor, motion sensor, proximity sensors, temperature sensors, moisture detection sensors, carbon monoxide sensors, biometric sensors, and/or a camera. The sensors 12 and/or electronic devices 14 may be communicatively coupled to the monitoring computing device 22.

In particular, the sensors 12 may capture data (e.g., contextual information 18) to monitor foot traffic within the smart house and/or within a neighborhood in which the smart home may be located. Foot traffic may be defined as the movement of people passing by the smart home in a neighborhood and/or the movement of residents within the smart home. Assessing foot traffic may be helpful in assessing risk associated with the smart home. For example, low levels of the foot traffic within the smart home during a period of time may indicate that the smart home empty or unoccupied for the period of time. Generally, empty or unoccupied properties are associated with a higher level of risk as residents are not present to address maintenance problems or other issues related to the property.

In some embodiments, commercial activity (e.g., contextual information 18) may be acquired via sensors 12 or electronic devices 14 to assess home activity and to capture movement within the smart home. An example of commercial activity includes identifying human activity during business hours (e.g., between 9 am to 5 pm) within a property. Commercial activity helps identify whether the property or smart home is a residential home, a rental property, a vacation home, a business property, and so forth. Risk associated with different types of property may vary. Thus, it may be helpful to identify the type of property being monitored.

For example, sensors 12 may include one or more motion sensors, one or more thermal sensors, a camera, and so forth to capture movement. The movement data may include a speed, a frequency, and a direction at which residents are moving near or within the smart home. The movement data may be described in any suitable unit (e.g., feet per minute, kilometers per hour, north, west, south, east, etc.). It may be appreciated that the movement data can be compared to other data to determine the occupancy or number of residents within or near the smart home.

The sensors may also capture maintenance information (e.g., sensor information 16) related to the smart home via moisture detection sensors, carbon monoxide sensors, and so forth. As mentioned previously, the monitoring computing device 22 or an analysis algorithm may determine whether the smart home is at risk due to freezing pipes or even a broken waterline based on analysis of data from the moisture detection sensors. These sensors may alert a user about potential leaks in the smart home so that the user may fix the maintenance issue before the damage from the leak occurs. In additional embodiments, carbon monoxide sensors may provide information related to measurements of carbon monoxide in the air of the smart home. If carbon monoxide levels are deemed higher than a threshold level by the monitoring computing device 22 or by the analysis algorithm, then the monitoring computing device 22 may notify or alert the user of a risk associated with high carbon monoxide levels.

Visual data may include imagery captured from one or more cameras (e.g., a dash camera, a backup camera, a front camera, a rear camera, a side camera, or any other camera) of within or mounted to the smart home or from a camera of the electronic devices 14. It may be appreciated that visual data may help detect movement within the smart house and capture resident actions, thereby helping assess user and home activity associated with the smart home.

Geographical location, weather, and climate (e.g., contextual information 18) of the smart home may be captured by location sensor(s), transceiver(s), and/or other software or hardware component(s) that are configured to determine the location using one or more of the following: an inertial navigation system, a dead-reckoning navigation system, a network positioning system, a radio position finding system, a satellite-based navigation system, an accelerometer system, a gyroscope system, and so forth. The satellite-based navigation system may include one or more of a Global Positioning System (GPS) receiver, a Global Navigation Satellite System (GLONASS) receiver, a Galileo receiver, an Indian Regional Navigational Satellite (IRNS) System receiver, and so forth. The location may also be determined through geolocation based on an internet protocol (IP) address of the electronic device 14 (e.g., smartphone). As mentioned previously, such contextual information may be used to analyze data related to the smart home. For example, knowledge of frequent tornadoes, severe weather conditions, and/or high traffic associated with the geographic location of the smart home may serve to increase a risk factor of the smart home.

In some embodiments, user behavior (e.g., contextual information 18 and financial information 20) may be assessed by performing machine learning on data related to user activity and home activity. User behavior may entail the user's ability to pay a deductible, willingness to be proactive, risk tolerance, buying behavior, driving behavior, lifestyle choices, and so forth. The user's ability to be proactive may be gleaned from past records or activity related to for example regular maintenance check-ups or preventative check-ups. For example, if a shingle is missing from the roof of a smart home, the user may be proactive and have the roof fixed before a leak occurs. By determining the user's proactive behavior, the monitoring computing device 22 or the analysis algorithm may determine a low risk associated with the smart home. On the other hand, if the if a shingle is missing from the roof of a smart home and the user waits to fix the roof until a leak or major maintenance issue occurs, then the monitoring computing device 22 or the analysis algorithm may determine a high risk associated with the smart home due to the user's lack of proactive behavior.

A user's driving behavior and lifestyle choices (e.g., magazine subscriptions, T.V. show choices) may also impact the risk associated with the smart home. For example, determining risky driving behavior acquired from a user's driving history or the user's tendency to travel to dangerous places may correlate with a higher risk associated with the smart home. On the other hand, low risk activities such as the user having a savings account may correlate with a lower risk associated with the smart home.

The user's ability to pay a deductible, risk tolerance, and buying behavior may be determined based on the financial information 20 acquired from electronic devices 14 (e.g., user's smartphone). In some embodiments, financial information related to user accounts may be accessible to the monitoring computing device 22. In other embodiments, rather than having direct access to financial information of a user, the monitoring computing device 22 may be provided with financial assessments of the user (e.g., buying behavior, whether the user is capable of paying a low, medium, or high deductible) from a financial institution. For example, if the monitoring computing device 22 or the analysis algorithm determines that the user is only capable of the paying a low deductible, then the risk associated with the smart home and user may be deemed high. As a result, the monitoring computing device 22 (e.g., insurer) may increase the home insurance quote of the user. On the other hand, if the monitoring computing device 22 or the analysis algorithm determines that the user is capable of paying a high deductible, then the risk associated with the smart home and user may be deemed low. As a result, the monitoring computing device 22 (e.g., insurer) may decrease the home insurance quote of the user.

Further risk tolerance associated with a user may be determined based on the user's past financial records (e.g., credit history), behaviors (e.g., buying behaviors) and so forth. For example, a risky credit history may indicate a higher level of risk associated with the user and the smart home. In some embodiments, the monitoring computing device 22 or the analysis algorithm may analyze credit history and buying behaviors in combination together. For example, a risky credit history and the user's tendency to purchase expensive consumer products and neglect home maintenance repairs may also indicate a higher level of risk associated with the smart home. Furthermore, if the user is willing to take on risk greater than average by him or herself, then the monitoring computing device 22 (e.g., insurer) may provide a lower insurance quote.

As mentioned previously, such user behavior based on contextual information 18 and financial information 20 is analyzed by performing machine learning on user and smart home related data. Accordingly, the monitoring computing device 22 may include machine learning circuitry 30. The machine learning circuitry 30 (e.g., circuitry used to implement machine learning algorithms or logic) may access the clean data to identify patterns, correlations, or trends associated with data related to the user and smart home. Because the original data is sourced from a multitude of diverse online services and databases, new data patterns not previously attainable may emerge. As used herein, machine learning may refer to algorithms and statistical models that computer systems use to perform a specific task with or without using explicit instructions. For example, a machine learning process may generate a mathematical model based on a sample of the clean data, known as "training data," in order to make predictions or decisions without being explicitly programmed to perform the task.

Depending on the inferences to be made, the machine learning circuitry 30 may implement different forms of machine learning. For example, in some embodiments (e.g., when particular known examples exist that correlate to future predictions or estimates that the machine learning circuitry 30 will be tasked with generating) supervised machine learning may be implemented. In supervised machine learning, the mathematical model of a set of data contains both the inputs and the desired outputs. This data is referred to as "training data" and is essentially a set of training examples. Each training example has one or more inputs and the desired output, also known as a supervisory signal. In a mathematical model, each training example is represented by an array or vector, sometimes called a feature vector, and the training data is represented by a matrix. Through iterative optimization of an objective function, supervised learning algorithms learn a function that can be used to predict the output associated with new inputs. An optimal function will allow the algorithm to correctly determine the output for inputs that were not a part of the training data. An algorithm that improves the accuracy of its outputs or predictions over time is said to have learned to perform that task.

Supervised learning algorithms include classification and regression. Classification algorithms are used when the outputs are restricted to a limited set of values, and regression algorithms are used when the outputs may have any numerical value within a range. Similarity learning is an area of supervised machine learning closely related to regression and classification, but the goal is to learn from examples using a similarity function that measures how similar or related two objects are. It has applications in ranking, recommendation systems, visual identity tracking, face verification, and speaker verification.

Additionally and/or alternatively, in some situations, it may be beneficial for the machine-learning circuitry to utilize unsupervised learning (e.g., when particular output types are not known). Unsupervised learning algorithms take a set of data that contains only inputs, and find structure in the data, like grouping or clustering of data points. The algorithms, therefore, learn from test data that has not been labeled, classified or categorized. Instead of responding to feedback, unsupervised learning algorithms identify commonalities in the data and react based on the presence or absence of such commonalities in each new piece of data.

Cluster analysis is the assignment of a set of observations into subsets (called clusters) so that observations within the same cluster are similar according to one or more predesignated criteria, while observations drawn from different clusters are dissimilar. Different clustering techniques make different assumptions on the structure of the data, often defined by some similarity metric and evaluated, for example, by internal compactness, or the similarity between members of the same cluster, and separation, the difference between clusters. For example, based on cluster analysis if a yard is well-maintained, the house has fresh paint, and the gutters are clean, then the house may be well-maintained. A low risk associated with a well-maintained house correlates with the low risk of a particular smart home. Other methods are based on estimated density and graph connectivity.

Predictions or correlations may be derived by the machine learning circuitry 30. For example, groupings and/or other classifications of user and smart home data may be used to predict user behaviors, home maintenance, and risk tolerance. The predictions may be provided to downstream applications, which may perform actions based upon the predictions. For example, as will be discussed in more detail below, particular GUI features may be rendered based upon the predictions, particular application features/functions may be enabled based upon the predictions, etc. This may greatly enhance the monitoring service's ability to provide a user accurate smart home information 32 with minimal user input. In some embodiments, the smart home information 32 may include a risk factor associated with the smart home and/or an adjustment to a home insurance quote. The risk factor may be on a scale from 1 to 10. In some embodiments, the smart home information 32 may include preventive measures or advice to reduce the risk associated with the smart home.

The monitoring computing device 22 may also include one or more processors 24. The processor(s) 24 may be configured to process instructions for execution within the monitoring computing device 22. The processor(s) 24 may include single-threaded processor(s), multi-threaded processor(s), or both. The processor(s) 24 may be configured to process instructions stored in the memory or on storage device(s). The processor(s) 24 may include hardware-based processor(s) each including one or more cores. The processor(s) 24 may include general purpose processor(s), special purpose processor(s), or both. The processor(s) 24 may be communicatively coupled to the sensors 12 and electronic devices 14. Based on acquiring the sensor information 16, contextual information 18, and financial information 20 as well as analyzing the acquired information via the machine learning circuitry 30, the process(es) may determine accurate insurance related values and provide accurate smart home information 32.

The monitoring computing device 22 may also include a memory 26 that is integral or attachable. For example, the memory 26 may be inserted into and ejected from the monitoring device 22 to facilitate transfer of information by moving the memory 26 between systems (e.g., the memory 26 may be shipped from the user to the insurer via mail and used to transfer data to the insurer's system on a periodic basis). The memory may enable the user and/or the monitoring service (e.g., insurer) to store and review aspects of smart home data. In some embodiments, the user and/or the insurer may be permitted access to all data stored in the memory 26. In some embodiments, the user and/or the insurer may not be permitted access to certain data stored in the memory 26.

The processor(s) 24 may analyze relevant smart home information 32 and send it to a client device 34 associated with the user via a network interface controller 28. The sensors 12, electronic devices 14 and the processor(s) 24 are communicatively coupled to the network interface controller 28. The network interface controller 28 enables relevant smart home information 32 to be sent to the client device 34 by connecting the client device 34 to the monitoring computing device 22.

The client device 34 may include any suitable type of computing device. In some instances, the client device 34 is a portable computing device such as a smartphone, tablet computer, wearable device, implanted computer, automotive computer, portable gaming platform, and so forth, the location of which may change throughout the course of a day or other period of time as the user moves about. In some embodiments, the client device 34 may also be a less portable type of computing device, such as a desktop computer, laptop computer, game console, smart appliance, and so forth. The client device 34 may also include a GUI 36. The GUI 36 will be described in more detail below.

In particular, the client device 34 and the monitoring computing device 22 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, 5G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

Figure 2:
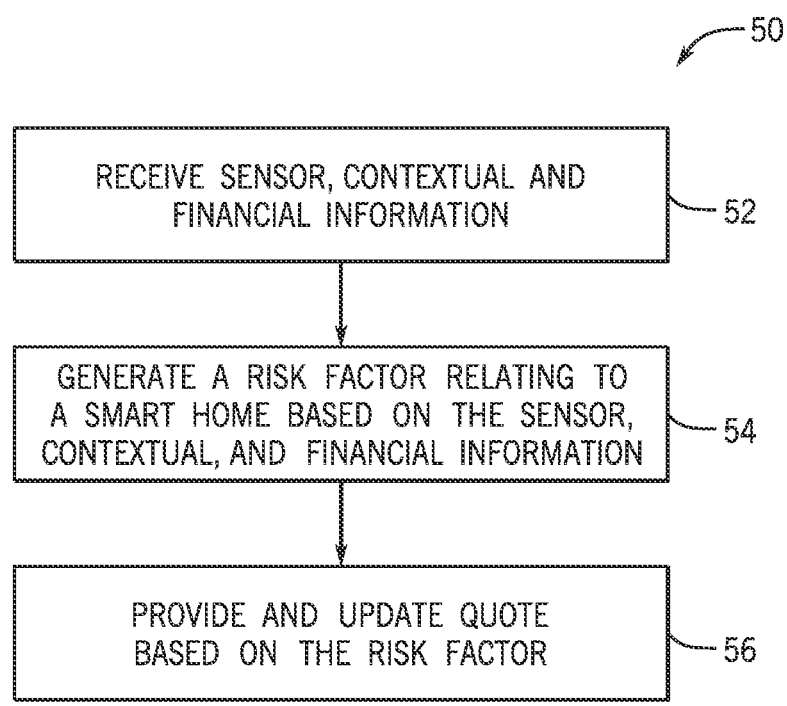
FIG. 2 is a flowchart that illustrates a process for determining and/or adjusting an insurance related value (e.g., home insurance quote) based on analyzing home activity via the smart home monitoring system of FIG. 1, in accordance with an embodiment of the present disclosure.

With the preceding in mind, FIG. 2 depicts a flow chart of an example process 50 adjusting and/or determining an insurance related value (e.g., home insurance quote) based on analyzing home activity, according to implementations of the present disclosure. While the process 50 is described using steps in a specific sequence, it should be understood that the present disclosure contemplates that the described steps may be performed in different sequences than the sequence illustrated, and certain described steps may be skipped or not performed altogether.

At block 52, the monitoring computing device 22 receive the sensor information 16, the contextual information 18, and the financial information 20 based on the processed described in FIG. 1. In turn, the monitoring computing device 22 or the insurer may generate a risk factor associated with a smart home or property based on analyzing the sensor information 16, the contextual information 18, and the financial information 20 (block 54).

For example, based on a high risk derived the sensor information 16, the contextual information 18, and the financial information 20, the insurer may generate a high risk factor associated with the smart home. In some embodiments, the risk factor may be based at least in part on other information related to the vehicle 10 and/or the user. For example, the risk factor may be based at least in part on historical information related to the smart home and the user data. As another example, in some embodiments, the user is notified when a home maintenance component needs attention. If the user consistently neglects to fix the maintenance issue, a high risk factor may be generated.

In some embodiments, the monitoring computing device 22 may include a software program (e.g., risk analysis software or insurance-related risk analysis software) stored in the memory 26 that is configured to generate the risk factor based on information relating to user and smart home data. The monitoring computing device 22 may run the software program via the processor 24 to generate the risk factor.

Based on the generated risk factor, the monitoring computing device 22 or insurer may provide the client device 34 an adjusted home insurance quote via the GUI 36 (block 56). The insurer or the analysis algorithm (e.g., integrated with the monitoring computing device 22) may send an instruction to adjust an insurance premium based on the risk factor. The insurer may use an algorithm that includes appropriately adjusting the insurance quote of the user based on the risk factor. For example, if a high risk factor is generated because the user consistently neglects regular maintenance check-ups, the home insurance quote may be adjusted (i.e., increased). In some cases, the risk factor may result in a zero adjustment to the insurance premium (i.e., no change to the home insurance quote).

Figure 3:
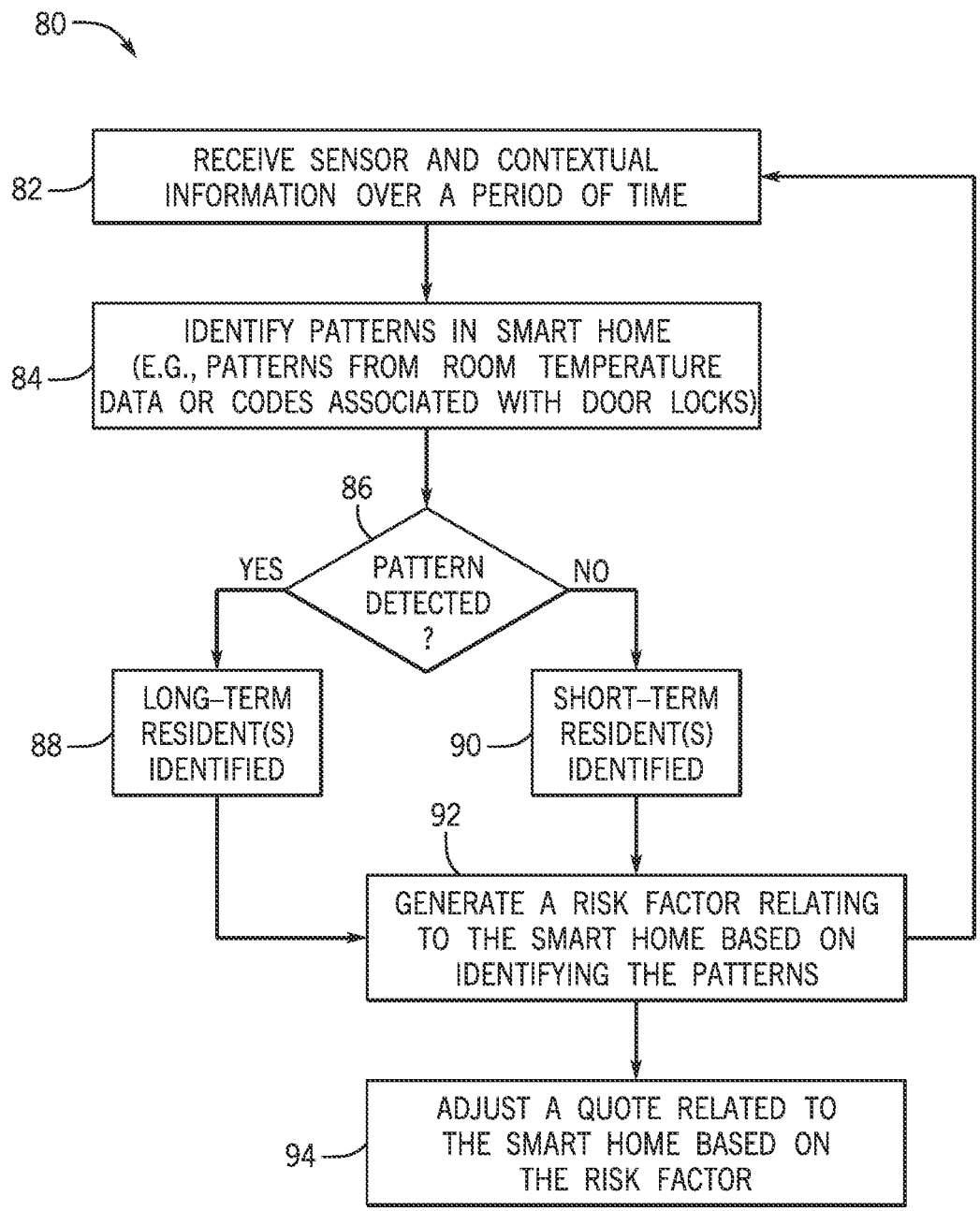
FIG. 3 is a flowchart that illustrates a process for determining whether a home is associated with long-term or short-term residency via the smart home monitoring system of FIG. 1, in accordance with an embodiment of the present disclosure.

Turning to FIG. 3, a flow chart of process 80 associated with determining long-term or short-term residence (e.g., rental homes, vacation homes) associated with a smart home is depicted. While the process 80 is described using steps in a specific sequence, it should be understood that the present disclosure contemplates that the described steps may be performed in different sequences than the sequence illustrated, and certain described steps may be skipped or not performed altogether. As mentioned previously, identifying the type of property and occupancy associated with the property may be helpful in assessing risk associated with the smart home. For example, low levels of foot traffic within the smart home during a period of time may indicate that the smart home empty or unoccupied for the period of time. Generally, empty or unoccupied properties are associated with a higher level of risk as residents are not present to address maintenance problems or other issues related to the property.

At block 82, the monitoring computing device 22 receive the sensor information 16, the contextual information 18, and the financial information 20 based on the processed described in FIG. 1. At block 84, the monitoring computing device 22 or analysis algorithm may identify patterns in smart home data and user data (e.g., patterns from room temperature data or codes associated with door locks).

At block 86, based on whether or not patterns are identified from the data, the monitoring computing device 22 or analysis algorithm may determine whether the smart home is associated with long-term or short-term residence. In one embodiment, data deemed to be random may indicate the presence of short-term residence as different residents may be moving in or out of the smart home. In another embodiment, particular patterns associated with the data may indicate long-term residence. For example, if the resident is out of the house during business hours but home during the weekends, the resident may be a homeowner or a long-term occupant. In some embodiments, the monitoring computing device 22 or analysis algorithm may analyze room temperature data acquired from temperature sensors. If the temperature on a thermostat in the smart home frequently changes, then the analysis algorithm (e.g., using a machine learning engine) may determine the house is associated with short-term residency as different residents may be changing the temperature during their varying periods of occupancies. However, if a pattern is detected in the temperature data or the temperature stays relatively constant, then the analysis algorithm may determine the house is associated with long-term residency. In another embodiment, the frequency that a code on a door lock changes may be analyzed. Similar to the thermostat, if the code is frequently changing, then the analysis algorithm may determine the house is associated with short-term residency as different residents may be changing the code to the door lock during their varying periods of occupancies. However, if the code stays relatively constant, then the analysis algorithm may determine the house is associated with long-term residency.

If a particular patterns are indeed present, then the analysis algorithm may determine the house is associated with long-term residency (block 88). However, at block 90, if patterns are absent, then the analysis algorithm may determine the house is associated with short-term residency. In some instances, patterns may be identified only when a certain threshold confidence score relating to the permanent resident patterns is exceeded. Thus, in situations where relatively weaker patterns of indication of permanent residence may occur, a more conservative approach may not identify permanent residency, even though the patterns tend to suggest that such activity may be occurring. Further, machine learning may be used to refine such pattern analysis, wherein the training data for the machine learning may be prior observed smart home activity.

At block 92, the monitoring computing device 22 may generate a risk factor associated with the smart home based on the pattern or lack of pattern identified. In one embodiment, the monitoring computing device 22 may generate a high risk factor in response to determining short-term residency associated with the smart home. Subsequently, at block 94, the monitoring computing device 22 or insurer may adjust (e.g., increase) the home insurance quote of the user. In another embodiment, the monitoring computing device 22 may generate a low risk factor in response to determining long-term residency associated with the smart home. Subsequently, the monitoring computing device 22 or insurer may adjust (e.g., decrease) the home insurance quote of the user (block 94).

Figure 4:
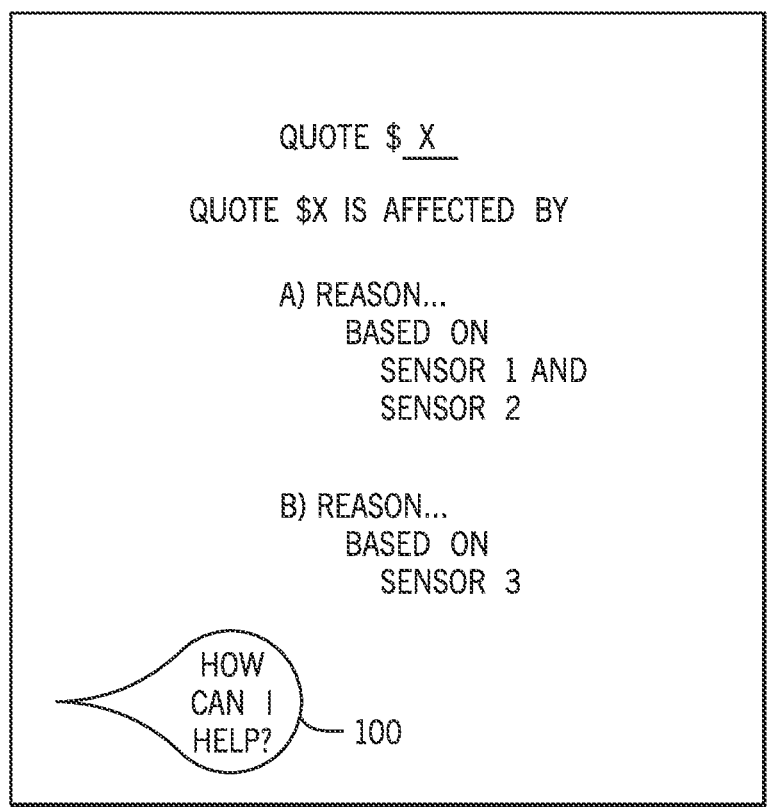
FIG. 4 is a graphical user interface (GUI) that depicts information related to home activity via the smart home monitoring system of FIG. 1, in accordance with an embodiment of the present disclosure.

As hinted above, the smart information 32 (e.g., adjustments to the home insurance quote) is displayed to the client via the GUI 36. Accordingly, FIG. 4 illustrates GUI 36 that presents the smart home information 32 to the user. In some embodiments, the GUI 36 may include a quantitative value associated with the home insurance quote and reasons for adjusting the home insurance quote. For example, text such as "We did not propose sinkhole coverage because you are not in a particular area of risk" or "We think you are not concerned with taking on risk, so we gave you a high deductible" may be presented to the user on the GUI 36. For example, if the user neglected a maintenance issue (e.g., leak in a pipe), then an increased insurance quote may be displayed to the user via the GUI 36. Additionally, the GUI 36 may include text that explains the increase in quote such as "We detected a leakage and provided a warning 3 months ago based on the moisture detection sensors."

While user input for analyzing smart home data is minimized, in some embodiments, the user may be able to interact with a virtual or smart agent 100 via voice or text queries. The virtual or smart agent 100 may provide rationale and detail behind varying policies. For example, if the user asks for information related to hurricane damage. The virtual or smart agent may provide information related to damage that originates from water or wind.

In some embodiments, the adjustments to insurance related values on the GUI 36 may be in or near real-time. In other embodiments, the monitoring computing device 22 or the insurer may provide feedback to the user (e.g., in real-time) in response to the sensor information 16, contextual information 18, and/or the financial information 20, which may encourage the user to maintain a smart home with desirable parameters. For example, in one embodiment, the user is notified home maintenance issues result in adjusting the user's insurance quote. Accordingly, the user may be encouraged to minimize behaviors that result in an increase in the insurance quote and maximize behaviors that result in a decrease in the insurance quote. Supply of such data in real-time (e.g., within a matter of seconds from measurement) may facilitate a game-type display of data that encourages user to low risk behavior and activity associated with the smart home within certain performance boundaries to achieve a desired score. As another example, a user could be informed that certain recent actions were improper (e.g., neglecting to fix a maintenance issue) and can result in increased premiums. Further, provision of feedback regarding user and smart home data may be utilized to encourage proper maintenance of the smart home, educate a user about certain issues (e.g., safety) or products (e.g., maintenance services or insurance products), and recommend vendors (e.g., maintenance repair shops).

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

While only certain features of the disclosure have been illustrated and described herein, many modifications and changes will occur to those skilled in the art. It is, therefore, to be understood that the appended claims are intended to cover all such modifications and changes as fall within the true spirit of the present disclosure. The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A monitoring device, comprising a memory and one or more processors, wherein the memory stores instructions that, when executed by the one or more processors, cause the one or more processors to:
   receive, via one or more sensors, maintenance information related to a property, wherein the property and the one or more sensors are remote from the monitoring device;
   receive, via the one or more sensors, contextual information related to the property, wherein the one or more sensors comprise: a door lock sensor, a thermostat sensor, or both and wherein the contextual information comprises: a history of door lock code operations reported by the door lock sensor, thermostat temperature changes reported by the thermostat sensor, or both;
   train a machine learning engine with the history of door lock code operations reported by the door lock sensor, thermostat temperature changes reported by the thermostat sensor, or both, to distinguish patterns between short term occupancy and long term occupancy;
   receive, via one or more user devices, financial information of a user associated with the property;
   identify, via the machine learning engine, an indication of whether occupancy of the property is short term occupancy or long term occupancy, the indication of whether occupancy of the property is short term occupancy or long term occupancy based at least in part on whether one or more patterns from the maintenance information, the history of door lock code operations, the thermostat temperature changes, or both the history of door lock code operations, the thermostat temperature changes, and the financial information are identified by the machine learning engine, by:
      setting the indication of whether occupancy of the property is short term occupancy or long term occupancy to short term occupancy when the one or more patterns are not identified from the contextual information; and setting the indication of whether occupancy of the property is short term occupancy or long term occupancy to long term occupancy when the one or more patterns are identified from the contextual information;

identify a risk factor relating to the property, based at least in part upon the identified indication of whether the occupancy of the property is short term occupancy or long term occupancy;

electronically adjust an insurance value in real time or near real-time based upon the risk factor; and provide, in real time or near real-time, via a graphical user interface, an indication of the adjusted insurance value, the indication of whether occupancy of the property is short term occupancy or long term occupancy and the risk factor and the one or more sensors providing data used to identify the risk factor.

2. The monitoring device of claim 1, wherein the one or more patterns of the maintenance information are related to a carbon monoxide level, a pipe condition, a yard condition, leakage information, a condition of equipment in the property, or any combination thereof.

3. The monitoring device of claim 1, wherein the one or more patterns of the contextual information comprise a crime rate associated with a geographical location of the property, an accident rate associated with the geographical location, weather associated with the geographical location, foot traffic associated the property, commercial activity associated with the property, or any combination thereof.

4. The monitoring device of claim 1, wherein the one or more sensors comprise one or more location sensors, one or more motion sensors, one or more proximity sensors, one or more temperature sensors, one or more carbon monoxide sensors, one or more moisture detection sensors, a camera, or any combination thereof.

5. The monitoring device of claim 1, wherein the one or more patterns of the financial information comprise buying behavior of the user, a financial record of the user, or both.

6. The monitoring device of claim 1, wherein the instructions cause the one or more processors to:
identify, using the machine learning engine, an increase in a purchase of products without completion of outstanding maintenance repairs based on the one or more patterns of the financial information; and
increase the risk factor based at least in part on determining the increase in the purchase of products without completion of the outstanding maintenance repairs.

7. The monitoring device of claim 1, wherein the instructions cause the one or more processors to increase a service cost associated with the property in response to increasing the risk factor.

8. The monitoring device of claim 1, wherein the instructions cause the one or more processors to:
identify, using the machine learning engine, the property being unoccupied for a period of time in response to determining that the one or more patterns of the contextual information comprise a low level of foot traffic associated with the property; and
increase the risk factor based at least in part on determining that the property is unoccupied for the period of time that is greater than a threshold period of time.

9. The monitoring device of claim 1, wherein the instructions cause the one or more processors to:
identify, using the machine learning engine, the property being occupied for a period of time greater than a threshold period of time based upon a pattern of temperature controls of a thermostat within the property; and
decrease the risk factor based at least in part on determining the property is occupied for the period of time that is greater than the threshold period of time.

10. A method, comprising:
receiving, at a monitoring device, via one or more sensors, maintenance information related to a property, wherein the property and the one or more sensors are remote from the monitoring device;
receiving, via the one or more sensors, contextual information related to the property, wherein the one or more sensors comprise: a door lock sensor, a thermostat sensor, or both and wherein the contextual information comprises: a history of door lock code operations reported by the door lock sensor, thermostat temperature changes reported by the thermostat sensor, or both;
training a machine learning engine with the history of door lock code operations reported by the door lock sensor, thermostat temperature changes reported by the thermostat sensor, or both, to distinguish patterns between short term occupancy and long term occupancy;
receiving, via one or more user devices, financial information of a user associated with the property;
identifying, via one or more processors by executing machine learning engine, an indication of whether occupancy of the property is short term occupancy or long term occupancy, the indication of whether occupancy of the property is short term occupancy or long term occupancy based at least in part on whether one or more patterns from the maintenance information, the history of door lock code operations, the thermostat temperature changes, or both of the contextual information, and the financial information are identified via the machine learning engine, by:
setting the indication of whether occupancy of the property is short term occupancy or long term occupancy to short term occupancy when the one or more patterns are not identified from the contextual information; and
setting the indication of whether occupancy of the property is short term occupancy or long term occupancy to long term occupancy when the one or more patterns are identified from the contextual information;
identifying a risk factor relating to the property, based at least in part upon the identified indication of whether the occupancy of the property is short term occupancy or long term occupancy; and
providing, via the one or more processors, in real time or near real time, an instruction to an output device to display the indication of whether occupancy of the property is short term occupancy or long term occupancy and an indication of the risk factor and the one or more sensors providing data used to identify the risk factor, via a graphical user interface.

11. The method of claim 10, comprising:
determining, via the one or more processors by executing the machine learning engine, a maintenance procedure that, if completed within a time period, would decrease the risk factor of the property; and
providing, via the one or more processors, a second instruction to the output device to display an indication of the maintenance procedure.

12. The method of claim 10, comprising:
 determining, via the one or more processors, a service cost for the property based on the risk factor; and
 providing, via the one or more processors, a third instruction to the output device to display an indication of the service cost.

13. The method of claim 10, comprising:
 identifying, via the one or more processors by executing the machine learning engine, a leakage in the property based on the maintenance information acquired from one or more moisture detection sensors;
 generating, via the one or more processors by executing the machine learning engine, the risk factor of the property based on the leakage in the property;
 determining, via the one or more processors by executing the machine learning engine, a completion of a maintenance procedure in response to receiving, via the one or more moisture detection sensors, an indication of an absence of the leakage; and
 decreasing, via the one or more processors by executing the machine learning engine, the risk factor of the property in response to the completion of the maintenance procedure and the absence of the leakage.

14. The method of claim 10, comprising determining, via the one or more processors by executing the machine learning engine, whether the property is associated with short-term occupancy or long-term occupancy based upon a pattern of foot traffic associated with the property.

15. The method of claim 14, comprising adjusting, via the one or more processors by executing the machine learning engine, the risk factor based on whether the property is associated with the short-term occupancy or the long-term occupancy.

16. A non-transitory, machine-readable medium comprising computer-executable instructions that, when executed by one or more processors, cause the one or more processors to:
 receive, at a monitoring device, via one or more sensors, maintenance information related to a property, wherein the property and the one or more sensors are remote from the monitoring device;
 receive, via the one or more sensors, contextual information related to the property, wherein the one or more sensors comprise: a door lock sensor, a thermostat sensor, or both and wherein the contextual information comprises: a history of door lock code operations reported by the door lock sensor, thermostat temperature changes reported by the thermostat sensor, or both;
 train a machine learning engine with the history of door lock code operations reported by the door lock sensor, thermostat temperature changes reported by the thermostat sensor, or both, to distinguish patterns between short term occupancy and long term occupancy;
 receive, via one or more user devices, financial information of a user associated with the property;
 identify an indication of whether occupancy of the property is short term occupancy or long term occupancy, the indication of whether occupancy of the property is short term occupancy or long term occupancy based at least in part on an analysis via the machine learning engine as to whether one or more patterns in the maintenance information, the history of door lock code operations, the thermostat temperature changes, or both, and the financial information are identified when executing a machine learning engine, by:
  setting the indication of whether occupancy of the property is short term occupancy or long term occupancy to short term occupancy when the one or more patterns are not identified from the contextual information; and
  setting the indication of whether occupancy of the property is short term occupancy or long term occupancy to long term occupancy when the one or more patterns are identified from the contextual information;
 identify a risk factor relating to the property, based at least in part upon the identified indication of whether the occupancy of the property is short term occupancy or long term occupancy; and
 provide an instruction in real time or near real time to an output device to cause the output device to display, via a graphical user interface, the indication of whether occupancy of the property is short term occupancy or long term occupancy and an indication of the risk factor and the one or more sensors providing data used to identify the risk factor.

17. The non-transitory, machine-readable medium of claim 16, wherein the contextual information comprises a length of occupancy of the property, and wherein the computer-executable instructions cause the one or more processors to:
 determine the property is unoccupied for a period of time in response to determining a low level of foot traffic associated with the property; and
 increase the risk factor based at least in part on determining that the property is unoccupied for the period of time that is greater than a threshold period of time.

* * * * *